United States Patent
Seo et al.

(10) Patent No.: US 11,472,279 B2
(45) Date of Patent: Oct. 18, 2022

(54) MOUNT FOR VEHICLE

(71) Applicants: HYUNDAI MOTOR COMPANY, Seoul (KR); KIA MOTORS CORPORATION, Seoul (KR)

(72) Inventors: Sungwon Seo, Seoul (KR); Wang Jian Wen, Hwaseong-si (KR); Woon Ki Cho, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 375 days.

(21) Appl. No.: 16/662,334

(22) Filed: Oct. 24, 2019

(65) Prior Publication Data

US 2021/0094402 A1 Apr. 1, 2021

(30) Foreign Application Priority Data

Sep. 27, 2019 (CN) .......................... 201910924035.7

(51) Int. Cl.
*B60K 5/12* (2006.01)
*F16F 15/023* (2006.01)
(Continued)

(52) U.S. Cl.
CPC .......... *B60K 5/1208* (2013.01); *F16F 15/023* (2013.01); *B60K 5/12* (2013.01);
(Continued)

(58) Field of Classification Search
CPC ...... B60K 5/1208; B60K 5/1266; B60K 5/12; F16F 15/023; F16F 13/105; F16F 13/08;
(Continued)

(56) References Cited

U.S. PATENT DOCUMENTS

| 4,836,515 A * | 6/1989 | Franz | F16F 13/262 |
| | | | 267/140.13 |
| 4,896,867 A * | 1/1990 | Schyboll | F16F 13/107 |
| | | | 180/902 |

(Continued)

FOREIGN PATENT DOCUMENTS

| CN | 104619537 A | 5/2015 |
| CN | 205523647 U | 8/2016 |

(Continued)

*Primary Examiner* — Paul N Dickson
*Assistant Examiner* — Timothy Wilhelm
(74) *Attorney, Agent, or Firm* — Lempia Summerfield Katz LLC (57) ABSTRACT

The present disclosure provides a mount for a vehicle that is provided at a portion at which damping performance is desired and that is fastened by a stud bolt. The mount for the vehicle includes a flange into which the stud bolt is inserted and that supports the stud bolt, an insulator configured to surround the flange, a housing coupled to the other one of the vibrating body or the supporting body and to which the insulator is fixed, a chamber formed inside the housing as a space surrounded by the housing and the insulator, and the chamber is filled with a fluid. In addition, the mount for the vehicle includes a damping part mounted on the housing to divide the chamber into two spaces and to be disposed in the chamber. The mount for the vehicle is configured to appropriately absorb vibrations and reduce noise.

19 Claims, 7 Drawing Sheets

(51) Int. Cl.
*F16F 13/10* (2006.01)
*F16F 13/08* (2006.01)
*F16F 13/14* (2006.01)
*F16F 13/26* (2006.01)

(52) U.S. Cl.
CPC ......... *B60K 5/1266* (2013.01); *B60Y 2306/09* (2013.01); *F16F 13/08* (2013.01); *F16F 13/105* (2013.01); *F16F 13/1481* (2013.01); *F16F 13/266* (2013.01)

(58) Field of Classification Search
CPC .. F16F 13/266; F16F 13/1481; B60Y 2306/09
See application file for complete search history.

(56) References Cited

U.S. PATENT DOCUMENTS

| | | | | |
|---|---|---|---|---|
| 4,921,232 | A * | 5/1990 | Hofmann | F16F 13/107 267/140.13 |
| 5,501,433 | A * | 3/1996 | Satori | F16F 13/106 267/140.13 |
| 6,131,894 | A * | 10/2000 | Satori | F16F 13/108 267/140.13 |
| 6,158,724 | A * | 12/2000 | Takashima | F16F 13/18 267/140.13 |
| 7,396,003 | B2 * | 7/2008 | Hibi | F16F 13/105 267/140.13 |
| 8,240,644 | B2 * | 8/2012 | Lemaire | F16F 13/106 267/140.13 |
| 8,783,668 | B2 * | 7/2014 | Ishikawa | F16F 13/08 267/140.13 |
| 8,807,544 | B2 * | 8/2014 | Yamamoto | F16F 13/106 267/140.13 |
| 8,998,186 | B2 * | 4/2015 | Kim | F16F 13/10 267/140.13 |
| 9,010,738 | B2 * | 4/2015 | Koga | F16F 13/107 267/140.13 |
| 9,097,310 | B2 | 8/2015 | Gaspar et al. | |
| 9,212,720 | B2 * | 12/2015 | Satori | F16F 13/105 |
| 9,222,542 | B2 * | 12/2015 | Kim | F16F 13/20 |
| 9,243,680 | B2 * | 1/2016 | Koyama | F16F 13/268 |
| 9,249,858 | B2 * | 2/2016 | Preikszas | F16F 13/107 |
| 9,441,704 | B2 | 9/2016 | Gaspar et al. | |
| 9,488,246 | B2 * | 11/2016 | Satori | F16F 13/106 |
| 9,695,902 | B2 * | 7/2017 | Kadowaki | F16F 13/106 |
| 9,816,581 | B2 * | 11/2017 | Ueki | F16F 13/107 |
| 9,850,977 | B2 | 12/2017 | Gaspar et al. | |
| 9,939,038 | B2 * | 4/2018 | Ueki | F16F 13/08 |
| 9,958,024 | B2 * | 5/2018 | Kadowaki | F16F 13/105 |
| 10,364,862 | B2 * | 7/2019 | Kim | F16F 9/34 |
| 10,520,057 | B2 * | 12/2019 | Kim | B60K 5/1225 |
| 2007/0057421 | A1 * | 3/2007 | Nanno | F16F 13/105 267/140.13 |
| 2014/0077428 | A1 | 3/2014 | Gaspar et al. | |
| 2015/0300444 | A1 | 10/2015 | Gaspar et al. | |
| 2016/0356336 | A1 | 12/2016 | Gaspar et al. | |
| 2017/0089420 | A1 * | 3/2017 | Kadowaki | B60K 5/1208 |
| 2020/0182326 | A1 * | 6/2020 | Kim | B60K 5/1225 |

FOREIGN PATENT DOCUMENTS

| | | |
|---|---|---|
| CN | 207921210 U | 9/2018 |
| CN | 109751359 A | 5/2019 |
| GB | 113412 A | 2/1918 |
| GB | 333274 A | 8/1930 |

* cited by examiner

MOUNT FOR VEHICLE

CROSS-REFERENCE TO RELATED APPLICATION

This application claims priority to and the benefit of Chinese Patent Application No. 201910924035.7, filed on Sep. 27, 2019, the entire contents of which are incorporated herein by reference in its entirety.

FIELD

The present disclosure relates to a mount for a vehicle. More particularly, the present disclosure relates to a mount for a vehicle having improved dynamic characteristics.

BACKGROUND

The statements in this section merely provide background information related to the present disclosure and may not constitute prior art.

Generally, a vehicle desires damping performance to absorb vibrations or impacts in many parts thereof. For example, due to vertical movement of a piston and rotational movement of a connecting rod and a crankshaft, which interlock with the piston, a center of gravity of an engine is periodically changed to generate considerable vibration.

Mounts may be applied to many positions of the vehicle at which the vibration occurs. Here, the mount refers to a device that is interposed between a structure in which vibration or impact is generated and a structure in which the structure is to be supported to absorb the vibration or impact. For example, a mount is interposed between an engine and a subframe.

However, we have discovered that a typical mount does not sufficiently and appropriately absorb complex vibrations occurring over a wide frequency band.

In other words, in the typical mount, when a fluid is filled in the mount so that the fluid absorbs the vibration or impact, the vibration may not be completely absorbed due to dynamic characteristics depending on securing a space for filling the fluid, and excessive noise may occur. That is, a frequency band of absorbable vibration is not wide. Meanwhile, in a case in which the above-mentioned space in which the fluid is filled is divided into two spaces and a membrane for circulating the fluid by communicating with the two spaces is further included such that the frequency band of the absorbable vibration is relatively widened, although the overall vibration absorption is improved, noise due to the vibration may occur.

The above information disclosed in this Background section is only for enhancement of understanding of the background of the disclosure, and therefore it may contain information that does not form the prior art that is already known in this country to a person of ordinary skill in the art.

SUMMARY

The present disclosure provides a mount for a vehicle that may sufficiently appropriately absorb complex vibrations occurring over a wide frequency band and may reduce occurrence of noise.

In addition, the present disclosure provides a mount for a vehicle that is provided at a portion at which damping is desired and that is fastened to either a vibrating body in which vibration or impact occurs or a supporting body for supporting the vibrating body by a stud bolt.

The mount for the vehicle according to the form of the present disclosure may include a flange into which the stud bolt is inserted and that supports the stud bolt, an insulator configured to surround the flange, a housing coupled to the other one of the vibrating body or the supporting body and to which the insulator is fixed, a chamber formed inside the housing as a space surrounded by the housing and the insulator, the chamber being filled with a fluid, and a damping part mounted on the housing to divide the chamber into two spaces and to be disposed in the chamber.

The damping part may include an upper cover formed to have a disc shape as an upper constituent element, a large displacement inlet passage disposed adjacent to a centrifugal center of the upper cover as a hole perforated in the upper cover in a vertical direction, at least one small displacement inlet passage disposed adjacent to a circumference of the upper cover as a hole perforated in the upper cover in the vertical direction, a lower cover formed to have a disc shape as a lower constituent element coupled to a lower side of the upper cover, a membrane mounting groove disposed adjacent to the circumference of the lower cover to communicate with the small displacement inlet passage and downwardly pressed from an upper surface of the lower cover, a large displacement communicating groove disposed adjacent to a centrifugal center of the lower cover to communicate with the large displacement inlet passage and downwardly pressed from the upper surface of the lower cover, a circulating passage extending to the outside of a radial direction of the lower cover while forming a spiral around the large displacement communicating groove from the large displacement communicating groove and downwardly pressed from the upper surface of the lower cover, a large displacement outlet passage perforated in the lower cover in the vertical direction at an end of the circulating passage extending to the outside of the radial direction of the lower cover, at least one small displacement outlet passage perforated in the lower cover in the vertical direction at a lower end of the membrane mounting groove, and a membrane formed to have a shape corresponding to the membrane mounting groove and mounted on the membrane mounting groove to have a clearance with the membrane mounting groove.

The at least one small displacement inlet passage may be formed to have a relatively long length along a circumferential direction of the upper cover.

The at least one small displacement inlet passage may be radially formed in the upper cover.

The small displacement inlet passages may be arranged at regular intervals along the circumferential direction of the upper cover.

A plurality of coupling protrusions upwardly protruding in the lower cover may be inserted into and fastened to a plurality of coupling holes perforated in the upper cover in the vertical direction so as to be arranged between the large displacement inlet passage and the small displacement inlet passage at positions corresponding to the coupling holes, and thus the upper cover and the lower cover may be coupled with each other.

The upper cover and the lower cover may have the same diameter.

The membrane mounting groove may form a circular shape concentric with the lower cover, and the membrane has an overall ring shape.

The circulating passage may be radially disposed more inside the lower cover than the membrane mounting groove.

The at least one small displacement outlet passage may be formed to have a relatively long length along a circumferential direction of the lower cover.

The at least one small displacement outlet passage may be radially formed in the lower cover.

The small displacement outlet passages may be arranged at regular intervals along the circumferential direction of the lower cover.

The membrane may be formed with an inner circumferential rail protruding in a vertical direction from an inner circumference of the membrane and extending along the inner circumference of the membrane, and an outer circumferential rail protruding in the vertical direction from an outer circumference of the membrane and extending along the outer circumference of the membrane.

The inner circumferential rail and the outer circumferential rail may protrude to have the same size.

The membrane may be formed with at least one inner circumferential protrusion protruding in the vertical direction from the inner circumferential rail, and at least one outer circumferential protrusion protruding in the vertical direction from the outer circumferential rail.

The at least one inner circumferential protrusion and the at least one outer circumferential protrusion may be formed radially in the membrane, respectively.

The inner circumferential protrusions and the outer circumferential protrusions may be arranged at regular intervals along the circumferential direction of the membrane, respectively.

The respective outer circumferential protrusion may be formed at a position corresponding to the respective inner circumferential protrusion in a radial direction of the membrane.

When a large displacement frequency band vibration occurs, a fluid filled in the chamber may sequentially pass through the large displacement inlet passage, the large displacement communicating groove, the circulating passage, and the large displacement outlet passage from an upper space of two divided spaces of the chamber, and then may flow in a lower space of the two divided spaces of the chamber.

When a small displacement frequency band vibration occurs, a fluid filled in the chamber may sequentially pass through the small displacement inlet passage, the membrane mounting groove, and the small displacement outlet passage from an upper space of two divided spaces of the chamber, and then may flow in a lower space of the two divided spaces of the chamber.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
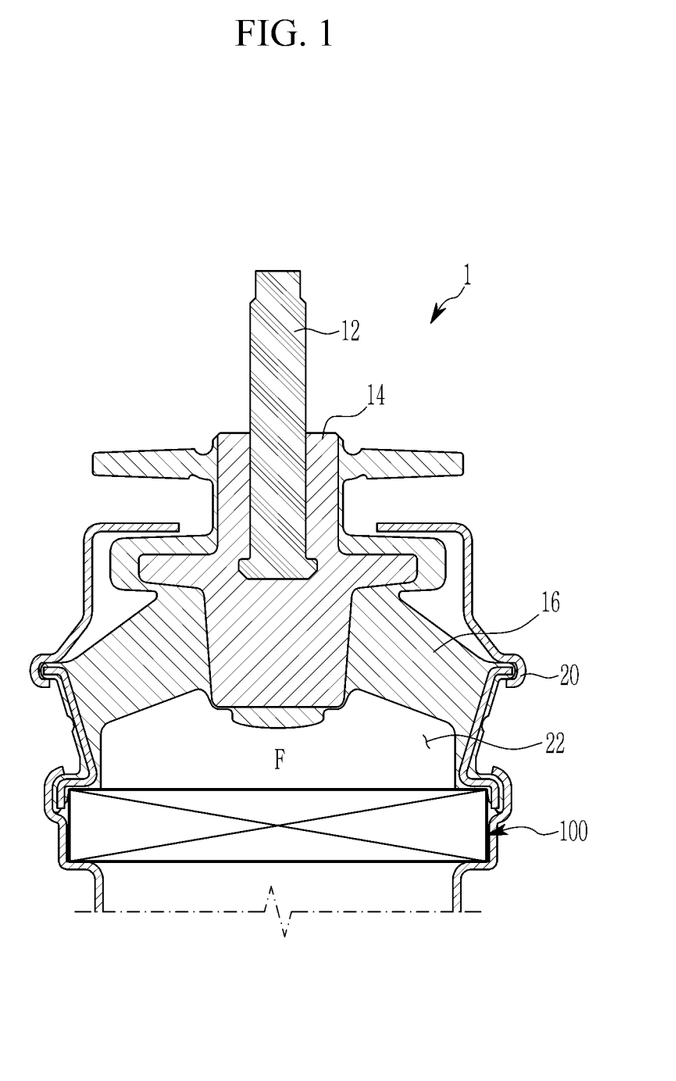
FIG. 1 illustrates a schematic diagram of a mount for a vehicle according to a form of the present disclosure.

FIG. 1 illustrates a schematic diagram of a mount for a vehicle according to a form of the present disclosure. In addition, FIG. 1 is a schematic cross-sectional view for visibly showing a structure of a mount 1 for a vehicle according to a form of the present disclosure.

As shown in FIG. 1, the mount 1 for the vehicle according to the form of the present disclosure includes a stud bolt 12, a flange 14, an insulator 16, a housing 20, and a damping part 100, and they are provided in a portion of a vehicle that desires damping performance to absorb vibrations or impacts such as a portion between an engine (not shown) and a subframe (not shown).

One end of the stud bolt 12 is fastened to one of a structure (not shown, hereinafter referred to as a vibrating body) that causes vibration or impact and a structure (not shown, hereinafter referred to as a supporting body) in which the vibrating body is supported. The other end of the stud bolt 12 is embedded in the mount 1.

The flange 14 supports the stud bolt 12. That is, the other end of the stud bolt 12 is inserted into the flange 14 and embedded therein.

The insulator 16 is provided to surround the flange 14. Here, it is obvious to a person of ordinary skill in the art (hereinafter referred to as those skilled in the art) that the insulator 16 is a material having a function of inhibiting vibration from being transmitted, and absorbing the vibration. Meanwhile, the flange 14 and the insulator 16 may be formed to have a circular cross-section centering on a centrifugal center of the stud bolt 12. In addition, the flange 14 has a disk shape that can be coupled with an object with a conventional shape, and the insulator 16 may be provided to surround the disk shape of the flange 14.

The housing 20 is a basic frame of the mount 1 that can be coupled with a frame or the like of a vehicle by welding or the like, and the insulator 16 is fixed to the housing 20. Here, the coupling of the housing 20 and the insulator 16 may be realized by various methods by those skilled in the art. For example, some of a portion having a circular cross-section of the insulator 16 may be pressed into the housing 20, or a portion of the insulator 16 surrounding the disk shape of the flange 14 may be bonded to the housing 20. Meanwhile, the housing 20 is coupled to one of the vibrating body and the supporting body, to which the stud bolts 12 are not fastened, and a coupling method thereof may be welding.

The damping part 100 is mounted on the housing 20. A chamber 22, which is a space surrounded by the housing 20 and the insulator 16, is formed in the housing 20. In addition, the damping part 100 is disposed in the chamber 22. Here, the chamber 22 is filled with a fluid F. In other words, the damping part 100 is provided to divide the chamber 22 into two spaces in a state of being immersed in the fluid F, and the damping part 100 reduces the vibration or impact generated from the vibrating body while the fluid F circulates inside the damping part 100 or passes through the damping part 100 so as to go through two divided spaces of the chamber 22.

Figure 2:
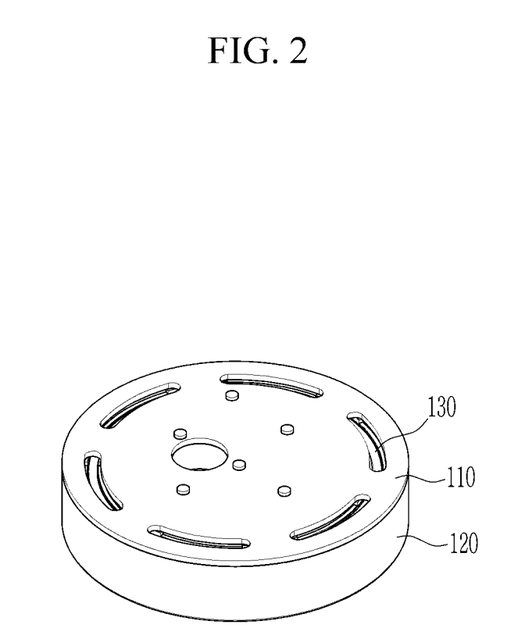
FIG. 2 illustrates a perspective view of a damping part of a mount for a vehicle according to a form of the present disclosure.
Figure 3:
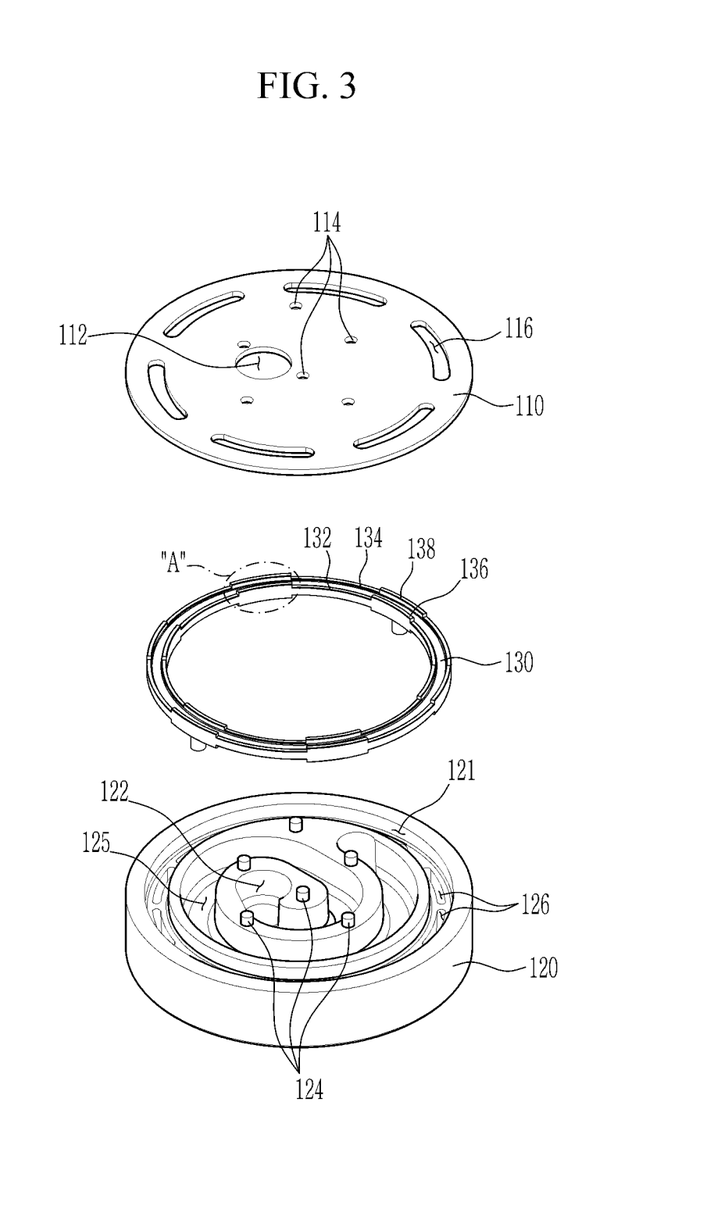
FIG. 3 illustrates an exploded view of a damping part of a mount for a vehicle according to a form of the present disclosure.
Figure 4:
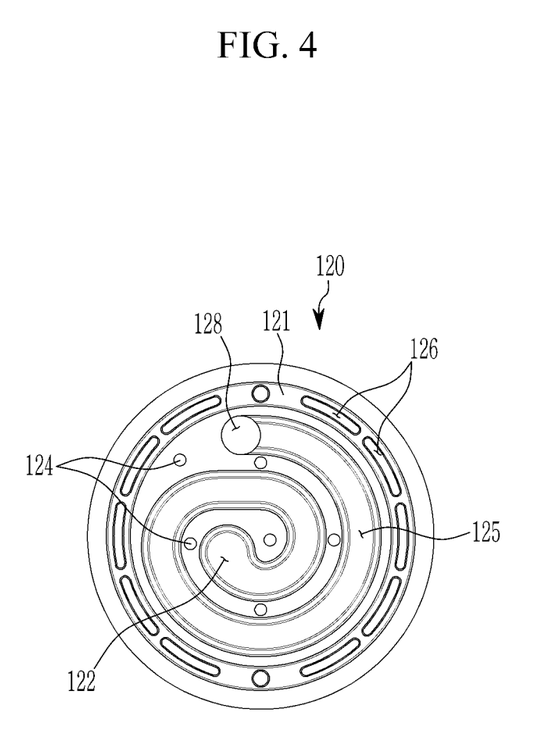
FIG. 4 illustrates a top plan view of a lower cover of a damping part according to a form of the present disclosure.
Figure 5:
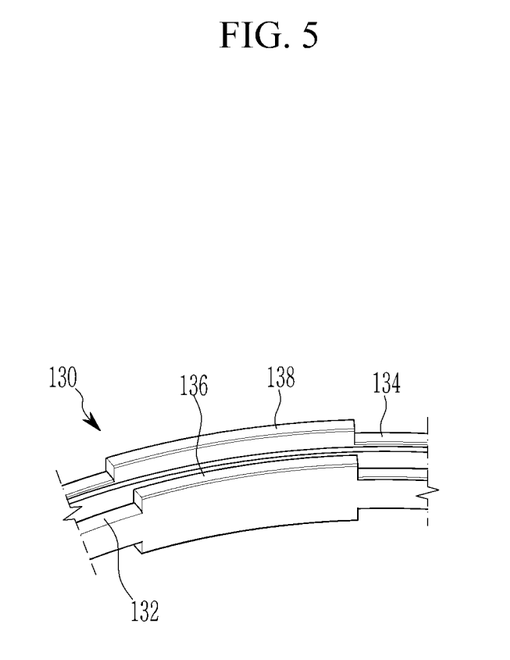
FIG. 5 illustrates an enlarged view of portion "A" of FIG. 3.

FIG. 2 illustrates a perspective view of a damping part of a mount for a vehicle according to a form of the present disclosure, FIG. 3 illustrates an exploded view of a damping part of a mount for a vehicle according to a form of the present disclosure, FIG. 4 illustrates a top plan view of a lower cover of a damping part according to a form of the present disclosure, and FIG. 5 illustrates an enlarged view of a portion "A" of FIG. 3.

As shown in FIG. 2 to FIG. 5, the damping part 100 includes an upper cover 110, a lower cover 120, and a membrane 130. The upper cover 110 is formed with a large displacement inlet passage 112, a small displacement inlet passage 116, and a coupling hole 114. The lower cover 120 is formed with a membrane mounting groove 121, a large displacement communicating groove 122, a circulating passage 125, a large displacement outlet passage 128, a small displacement outlet passage 126, and a coupling protrusion 124. The membrane 130 is formed with an inner circumferential rail 132, an outer circumferential rail 134, an inner circumferential protrusion 136, and an outer circumferential protrusion 138.

The upper cover 110 is an upper constituent element of the damping part 100, and the upper cover 110 is preferably formed to have a disc shape when the flange 14, the insulator 16, and the housing 20 are formed to have a circular cross-section centering the centrifugal center of the stud bolt 12. Here, it is to be understood that the stud bolt 12 may be eccentrically extended or be tilted from the centrifugal center of the circular cross-sections, although the centrifugal center of the stud bolt 12 is provided as a reference of the circular cross-sections. For convenience of explanation, it is assumed in the following description that the upper cover 110 is formed to have a disc shape. The upper cover 110 is defined as an upper constituent element of the damping part 100, although the actual arrangement thereof may be varied.

The large displacement inlet passage 112 is a passage through which the fluid F flows while the vibrating body vibrates in a large displacement frequency band. The large displacement inlet passage 112 is disposed to be adjacent to the centrifugal center of the disc-shaped upper cover 110, and it may be a circular hole that is eccentrically distanced from the centrifugal center of the upper cover 110 for smoothly flowing of the inflowing fluid F and is perforated in a vertical direction.

The small displacement inlet passage 116 is a passage through which the fluid F flows while the vibrating body vibrates in a small displacement frequency band. In addition, the small displacement inlet passage 116 is disposed in the vicinity of a circumference of the disk-shaped upper cover 110, and it may be a hole perforated in a vertical direction of the upper cover 110 to have a relatively long length along a circumferential direction of the upper cover 110. Further, a plurality of the small displacement inlet passages 116 may be radially formed in the disc-shaped upper cover 110, and may be arranged at regular intervals along a circumferential direction of the upper cover 110. For example, six small displacement inlet passages 116 are shown in the drawing (see FIG. 2), but the present disclosure is not limited thereto. A distance between the large displacement inlet passage 112 close to the centrifugal center and the centrifugal center, and a distance between the small displacement inlet passage 116 close to the circumference and the circumference, may vary according to a design by those skilled in the art, but the large displacement inlet passage 112 is designed to be relatively closer to the centrifugal center than the small displacement inlet passage 116, and the small displacement inlet passage 116 is designed to be relatively closer to the circumference than the large displacement inlet passage 112.

A plurality of the coupling holes 114 are formed in the upper cover 110 in the vertical direction within a range that does not deteriorate the durability of the upper cover 110. In addition, the coupling holes 114 are arranged between the large displacement inlet passage 112 and the small displacement inlet passage 116.

The lower cover 120 is a lower constituent element of the damping part 100, and it is preferably formed to have a disc shape when the upper cover 110 is formed to have a disc shape. In addition, the lower cover 120 is coupled to a lower side of the upper cover 110. Here, the upper cover 110 and the lower cover 120 may have the same diameter. Furthermore, the lower cover 120 has a predetermined length in an axial direction of the centrifugal center so that the fluid F may be circulated inside the damping part 100. In other words, an overall shape in which the lower cover 120 and the upper cover 110 are coupled may be a cylindrical shape.

The membrane mounting groove 121 is pressed downward from an upper surface of the lower cover 120. The membrane mounting groove 121 is disposed adjacent to the circumference of the disc-shaped lower cover 120 so as to communicate with the small displacement inlet passage 116, and extends along the circumferential direction of the lower cover 120 to form a circular shape concentric with the cover 120.

The large displacement communicating groove 122 is pressed downward from the upper surface of the lower cover 120. The large displacement communicating groove 122 is disposed in close proximity to the centrifugal center of the disc-shaped lower cover 120 so as to communicate with the large displacement inlet passage 112.

The circulating passage 125 is pressed downward from the upper surface of the lower cover 120. The circulating passage 125 communicates with the large displacement communicating groove 122, and extends radially outward of the lower cover 120 while forming a spiral around the large displacement communicating groove 122 from the large displacement communicating groove 122. Here, the circulating passage 125 is disposed more radially inward of the lower cover 120 than the membrane mounting groove 121.

The large displacement outlet passage 128 is a hole that is perforated in the lower cover 120 in the vertical direction, and it is formed in an end portion of the circulating passage 125 extending outward in the radial direction of the lower cover 120. In other words, the fluid F flowing into the damping part 100 through the large displacement inlet passage 112 is discharged through the large displacement outlet passage 128 after sequentially passing through the large displacement communicating groove 122 and the circulating passage 125.

The small displacement outlet passage 126 is a hole that is perforated in the lower cover 120 in the vertical direction, and it is formed in a lower end of the membrane mounting groove 121. In addition, the small displacement outlet passage 126 is formed to have a relatively long length along a circumferential direction of the lower cover 120. Further, a plurality of the small displacement outlet passages 126 may be radially formed in the disk-shaped lower cover 120, and they may be arranged at regular intervals along the circumferential direction of the lower cover 120. In other words, the fluid F flowing into the damping part 100 through the small displacement inlet passage 116 is discharged through the small displacement outlet passage 126 after passing through the membrane mounting groove 121. For example, ten small displacement outlet passages 126 are shown in the drawing (see FIG. 4), but the present disclosure is not limited thereto.

A plurality of the coupling protrusions 124 protrude upward from the lower cover 120 at positions corresponding to the coupling holes 114 of the upper cover 110. Here, the positions at which the coupling protrusions 124 are formed are positions at which the membrane mounting groove 121, the large displacement communicating groove 122, the circulating passage 125, and the like are not formed. In addition, the coupling protrusion 124 is inserted into the coupling hole 114 and fastened to the coupling hole 114, so that the upper cover 110 and the lower cover 120 are coupled.

The membrane 130 has an overall ring shape and is mounted on the membrane mounting groove 121 of the lower cover 120. In addition, the membrane 130 converts the vibration or impact generated from the vibrating body transmitted through the flow of the fluid F into kinetic energy, thereby canceling (absorbing) the vibration or impact. That is, the membrane 130 is formed to have a shape corresponding to the membrane mounting groove 121 and has a clearance with the membrane mounting groove 121.

The inner circumferential rail 132 protrudes in the vertical direction from the inner circumference of the membrane 130 and extends along the inner circumference of the membrane 130.

The outer circumferential rail 134 protrudes in the vertical direction from the outer circumference of the membrane 130 and extends along the outer circumference of the membrane 130. That is, grooves extending along the circumference of the membrane 130 are formed between the inner circumferential rail 132 and the outer circumferential rail 134. Meanwhile, the inner circumferential rail 132 and the outer circumferential rail 134 may protrude to have the same size.

The inner circumferential protrusion 136 further protrudes from the inner circumferential rail 132 in the vertical direction. A plurality of the inner circumferential protrusions 136 are radially formed in the membrane 130, and may be arranged at equal intervals along the circumferential direction of the membrane 130.

The outer circumferential protrusion 138 further protrudes in the vertical direction from the outer circumferential rail 134. A plurality of the outer circumferential protrusions 138 are radially formed in the membrane 130, and may be arranged at regular intervals along the circumferential direction of the membrane 130. Here, the outer circumferential protrusion 138 is formed at a position corresponding to the inner circumferential protrusion 136 in the radial direction of the membrane 130. For example, six inner circumferential protrusions 136 and six outer circumferential protrusions 138 are shown in the drawing (see FIG. 3), but the present disclosure is not limited thereto.

The inner circumferential rail 132, the outer circumferential rail 134, the inner circumferential protrusion 136, and the outer circumferential protrusion 138 are formed to have shapes with dynamic characteristics according to a design by those skilled in the art, and the shapes preferably correspond to the described shape.

Figure 6A:
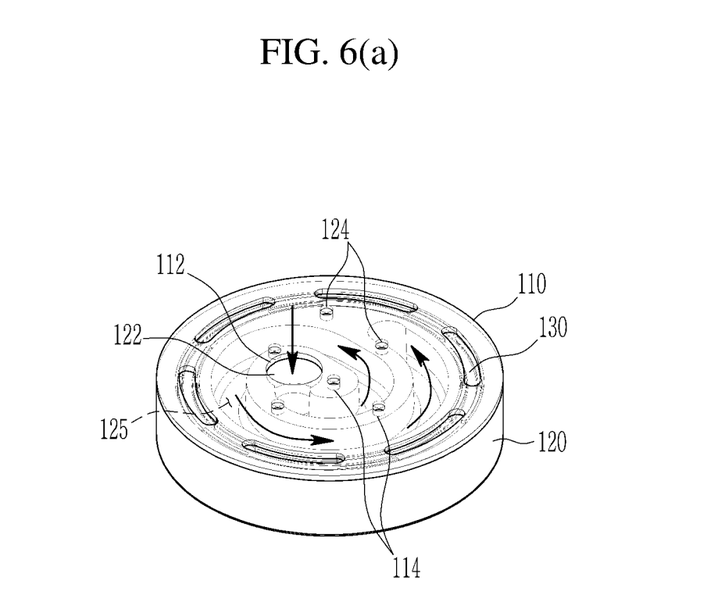
FIGS. 6(a) and (b) are schematic views showing flow of a fluid passing through a damping part of a mount for a vehicle according to a form of the present disclosure in a large displacement frequency band.
Figure 6B:
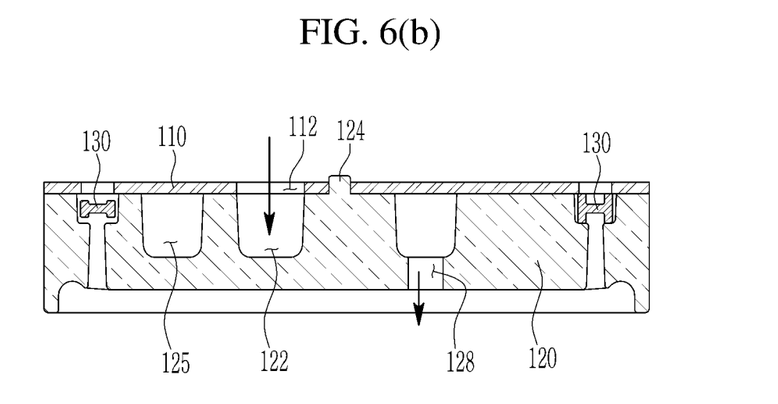

FIGS. 6(a) and (b) are schematic views showing flow of a fluid passing through a damping part of a mount for a vehicle according to a form of the present disclosure in a large displacement frequency band.

As shown in FIGS. 6(a) and (b), when a large displacement frequency band vibration occurs at the vibrating body, the fluid F filled in the chamber 22 sequentially passes through the large displacement inlet passage 112, the large displacement communicating groove 122, the circulating passage 125, and the large displacement outlet passage 128 from the upper space of the divided spaces of the chamber 22, and then flows in the lower space of the two divided spaces of the chamber 22. The large displacement frequency band vibration is canceled (absorbed) by the flow of the fluid F described above.

Figure 7A:
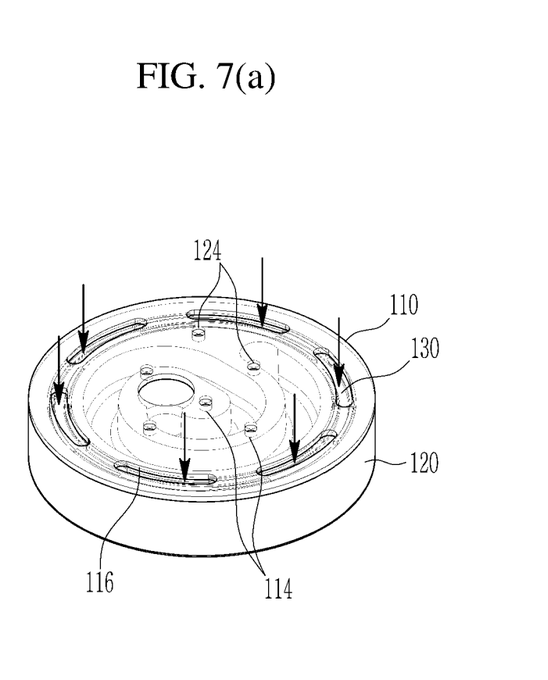
FIGS. 7(a) and (b) are schematic views showing flow of a fluid passing through a damping part of a mount for a vehicle according to a form of the present disclosure in a small displacement frequency band.
Figure 7B:
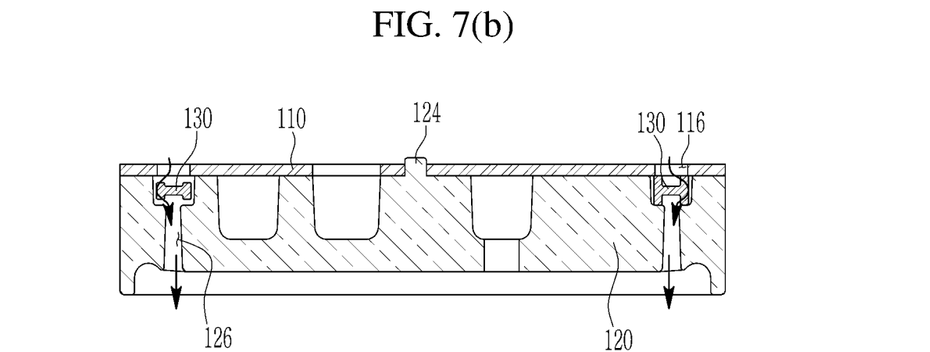

FIGS. 7(a) and (b) are schematic views showing flow of a fluid passing through a damping part of a mount for a vehicle according to a form of the present disclosure in a small displacement frequency band.

As shown in FIGS. 7(a) and (b), when a small displacement frequency band vibration occurs at the vibrating body, the fluid F filled in the chamber 22 sequentially passes through the small displacement inlet passage 116, the membrane mounting groove 121, and the small displacement outlet passage 126 from the upper space of the divided spaces of the chamber 22, and then flows in the lower space of the two divided spaces of the chamber 22. The small displacement frequency band vibration is canceled (absorbed) by the flow of the fluid F described above. Here, the large displacement frequency band vibration and the small displacement frequency band vibration are relative to each other, and there may be portions in which both the fluid F sequentially passing through the large displacement inlet passage 112, the large displacement communicating groove 122, the circulating passage 125, and the large displacement outlet passage 128 and the fluid F sequentially passing through the small displacement inlet passage 116, the membrane mounting groove 121, and the small displacement outlet passage 126 may flow.

As described above, according to the form of the present disclosure, it is possible to reduce the noise while maintaining the damping performance by the mount in which the fluid is filled and in which the membrane for dividing the space in which the fluid F is filled is provided. In addition, the frequency band of the absorbable vibration may be enlarged. Further, the contact area between the fluid F and the membrane 130 may be reduced, thereby inhibiting a hitting sound when the fluid F hits the membrane 130 and the vibration noise due to the vibration of the membrane 130. Furthermore, no additional structure for absorbing (or reducing) the hitting sound and vibration noise occurring at the existing membrane is needed, thereby reducing the production cost.

While this disclosure has been described in connection with what is presently considered to be practical exemplary forms, it is to be understood that the disclosure is not limited to the disclosed forms, but, on the contrary, it is intended to cover various modifications and equivalent arrangements included within the spirit and scope of the present disclosure.

What is claimed is:
1. A mount for a vehicle that is provided at a portion at which damping is desired and that is fastened to one of a vibrating body in which vibration or impact occurs and a supporting body for supporting the vibrating body by a stud bolt, comprising:
- a flange into which the stud bolt is inserted and that supports the stud bolt;
- an insulator configured to surround the flange;
- a housing coupled to the other one of the vibrating body or the supporting body and to which the insulator is fixed;
- a chamber formed inside the housing as a space surrounded by the housing and the insulator, the chamber being filled with a fluid; and
- a damping part mounted on the housing to divide the chamber into two spaces and to be disposed in the chamber, wherein the damping part includes:
- an upper cover formed to have a disc shape as an upper constituent element;
- a large displacement inlet passage disposed adjacent to a centrifugal center of the upper cover as a hole perforated in the upper cover in a vertical direction;
- at least one small displacement inlet passage disposed adjacent to a circumference of the upper cover as a hole perforated in the upper cover in the vertical direction;
- a lower cover formed to have a disc shape as a lower constituent element coupled to a lower side of the upper cover;
- a membrane mounting groove disposed adjacent to the circumference of the lower cover to communicate with the small displacement inlet passage and downwardly pressed from an upper surface of the lower cover;
- a large displacement communicating groove disposed adjacent to a centrifugal center of the lower cover to communicate with the large displacement inlet passage and downwardly pressed from the upper surface of the lower cover;
- a circulating passage extending to the outside of a radial direction of the lower cover while forming a spiral around the large displacement communicating groove from the large displacement communicating groove and downwardly pressed from the upper surface of the lower cover;
- a large displacement outlet passage perforated in the lower cover in the vertical direction at an end of the circulating passage extending to the outside of the radial direction of the lower cover;
- at least one small displacement outlet passage perforated in the lower cover in the vertical direction at a lower end of the membrane mounting groove; and
- a membrane formed to have a shape corresponding to the membrane mounting groove and mounted on the membrane mounting groove to have a clearance with the membrane mounting groove.

2. The mount for the vehicle of claim 1, wherein
the at least one small displacement inlet passage is formed to have a relatively long length along a circumferential direction of the upper cover.

3. The mount for the vehicle of claim 1, wherein
the at least one small displacement inlet passage is radially formed in the upper cover.

4. The mount for the vehicle of claim 3, wherein
the small displacement inlet passages are arranged at regular intervals along a circumferential direction of the upper cover.

5. The mount for the vehicle of claim 1, wherein
a plurality of coupling protrusions upwardly protruding in the lower cover are inserted into and fastened to a plurality of coupling holes perforated in the upper cover in the vertical direction so as to be arranged between the large displacement inlet passage and the small displacement inlet passage at positions corresponding to the coupling holes, and thus the upper cover and the lower cover are coupled with each other.

6. The mount for the vehicle of claim 1, wherein
the upper cover and the lower cover have the same diameter.

7. The mount for the vehicle of claim 1, wherein
the membrane mounting groove forms a circular shape concentric with the lower cover, and the membrane has an overall ring shape.

8. The mount for the vehicle of claim 1, wherein
the circulating passage is radially disposed more inside the lower cover than the membrane mounting groove.

9. The mount for the vehicle of claim 1, wherein
the at least one small displacement outlet passage is formed to have a relatively long length along a circumferential direction of the lower cover.

10. The mount for the vehicle of claim 1, wherein
the at least one small displacement outlet passage is radially formed in the lower cover.

11. The mount for the vehicle of claim 10, wherein
the small displacement outlet passages are arranged at regular intervals along a circumferential direction of the lower cover.

12. The mount for the vehicle of claim 1, wherein
the membrane is formed with:
- an inner circumferential rail protruding in a vertical direction from an inner circumference of the membrane and extending along the inner circumference of the membrane; and
- an outer circumferential rail protruding in the vertical direction from an outer circumference of the membrane and extending along the outer circumference of the membrane.

13. The mount for the vehicle of claim 12, wherein
the inner circumferential rail and the outer circumferential rail protrude to have the same size.

14. The mount for the vehicle of claim 12, wherein
the membrane is formed with:
- at least one inner circumferential protrusion protruding in the vertical direction from the inner circumferential rail; and
- at least one outer circumferential protrusion protruding in the vertical direction from the outer circumferential rail.

15. The mount for the vehicle of claim 14, wherein
the at least one inner circumferential protrusion and the at least one outer circumferential protrusion is formed radially in the membrane, respectively.

16. The mount for the vehicle of claim 15, wherein
the inner circumferential protrusions and the outer circumferential protrusions are arranged at regular intervals along a circumferential direction of the membrane, respectively.

17. The mount for the vehicle of claim 15, wherein
the respective outer circumferential protrusion is formed at a position corresponding to the respective inner circumferential protrusion in a radial direction of the membrane.

18. The mount for the vehicle of claim 1, wherein
when a large displacement frequency band vibration occurs, a fluid filled in the chamber sequentially passes through the large displacement inlet passage, the large displacement communicating groove, the circulating passage, and the large displacement outlet passage from an upper space of two divided spaces of the chamber, and then flows in a lower space of the two divided spaces of the chamber.

19. The mount for the vehicle of claim 1, wherein when a small displacement frequency band vibration occurs, a fluid filled in the chamber sequentially passes through the small displacement inlet passage, the membrane mounting groove, and the small displacement outlet passage from an upper space of two divided spaces of the chamber, and then flows in a lower space of the two divided spaces of the chamber.

* * * * *